United States Patent [19]

Deng

[11] 4,407,235

[45] Oct. 4, 1983

[54] SAFETY BOILER WITH HIGH EFFICIENCY

[76] Inventor: Shye-Yih Deng, 10-4 Fl., No. 62, Chang-Chun Rd., Taipei, Taiwan

[21] Appl. No.: 363,581

[22] Filed: Mar. 31, 1982

[51] Int. Cl.³ .............................................. F22B 7/00
[52] U.S. Cl. .............................. 122/161; 122/367 R; 122/162; 122/135 F; 122/438
[58] Field of Search ................ 122/134, 261, 160–162, 122/135 F, 155 A, 155 F, 235 K, 438, 370, 451, 460

[56] References Cited

U.S. PATENT DOCUMENTS

| 895,280 | 8/1908 | Mackley | 122/161 |
|---|---|---|---|
| 1,140,597 | 5/1915 | Junkers | 122/161 |
| 1,220,312 | 3/1917 | Bergeron | 122/161 |
| 1,356,098 | 10/1920 | Trumble | 122/161 |
| 1,684,201 | 9/1928 | Pollock | 122/161 |
| 1,841,230 | 1/1932 | Vuia et al. | 122/161 |
| 2,187,044 | 1/1940 | McBath | 122/438 |
| 2,787,256 | 4/1957 | Ilume | 122/161 |
| 2,832,320 | 4/1958 | Thome et al. | 122/161 |
| 3,233,596 | 2/1966 | Gerbert | 122/367 R |

FOREIGN PATENT DOCUMENTS 585876  3/1925  France ................................. 122/160

*Primary Examiner*—Henry C. Yuen

[57] ABSTRACT

A safety boiler with high efficiency comprises a plurality of water jackets disposed around a central vaporizing chamber positioned atop on a combustion chamber and a plurality of sandwiched flues each respectively partitioned between each two neighboring water jackets so that the feed water passing the water jackets will be thoroughly preheated to increase the thermal efficiency and safety of the boiler.

1 Claim, 5 Drawing Figures

SAFETY BOILER WITH HIGH EFFICIENCY

BACKGROUND OF THE INVENTION

Conventional boilers either fire tube type or water tube type are generally found with the following defects:
1. In order to sustain the high pressure of generated steam, all the construction parts should be designed with suitable thickness durable for such high steam pressure, which can not be reduced to be thinner so that the production cost of boiler will not be reduced.
2. The heat conductivity of such thicker steel plates or tubes will be reduced so as to decrease the thermal efficiency of boiler.
3. The outmost boiler shell should be insulated to prevent heat loss therefrom to increase insulation cost and maintenance problem for the insulated material as the boiler shell still carry an appreciated heat which should be well insulated.
4. The boiler shell directly receives the high pressure of steam inside the boiler so that, once accidental explosion occurring, the outer broken scraps will directly and rapidly spread outwards to cause serious damage to the surroundings.

The present inventor has found these defects of conventional boilers and invented the present invention in view of the following specification and the accompanying drawings.

SUMMARY OF THE INVENTION

The object of the present invention is to provide a safety boiler wherein a plurality of water jackets are disposed around a central vaporizing chamber positioned atop on a combustion chamber and a plurality of sandwiched flues are provided each being respectively partitioned between each two neighbouring water jackets so that the feed water passing the water jackets will be thoroughly preheated to increase the thermal efficiency of the boiler.

DETAILED DESCRIPTION

Figure 1:
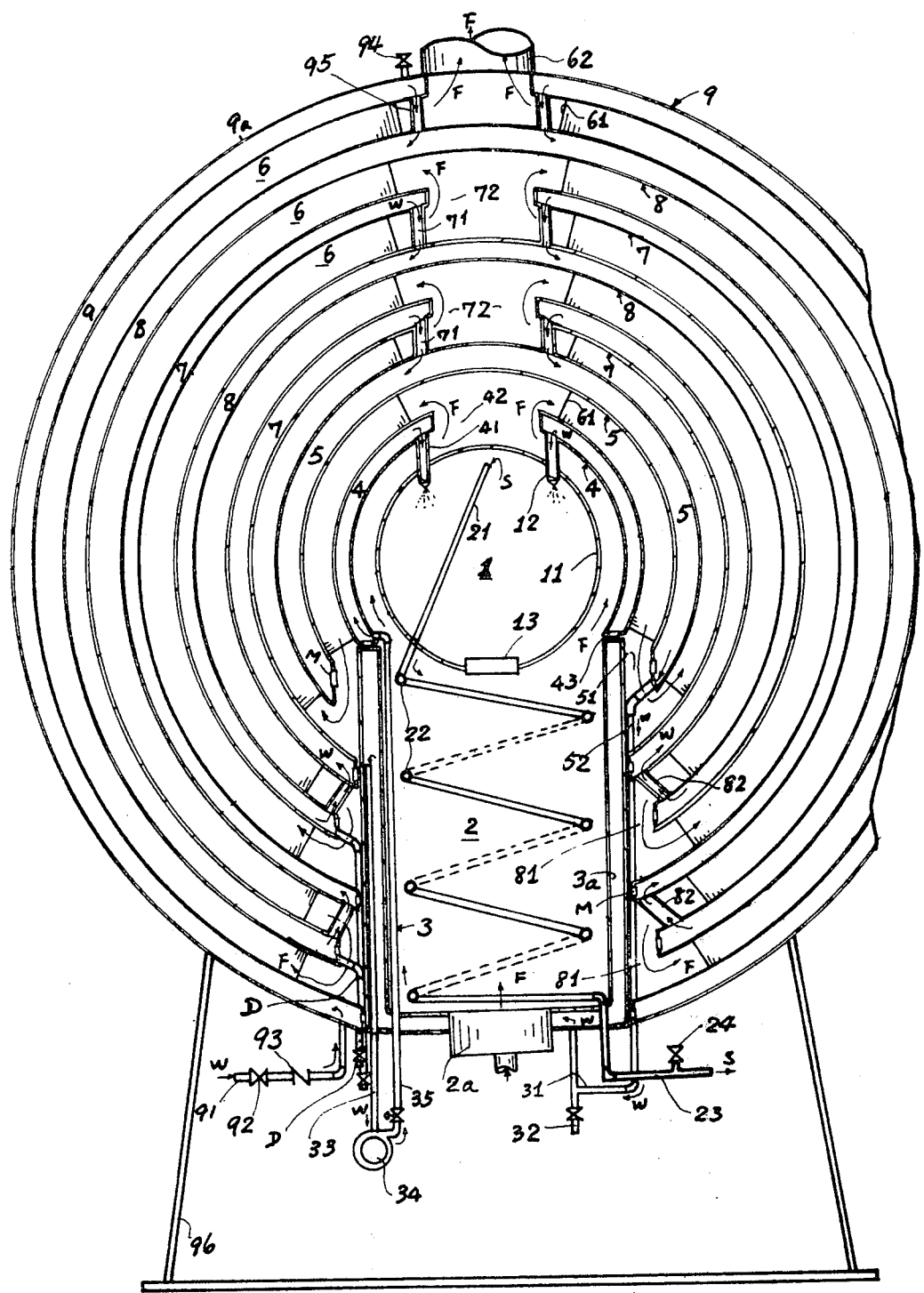
FIG. 1 is elevated sectional drawing of the present invention.
Figure 2:
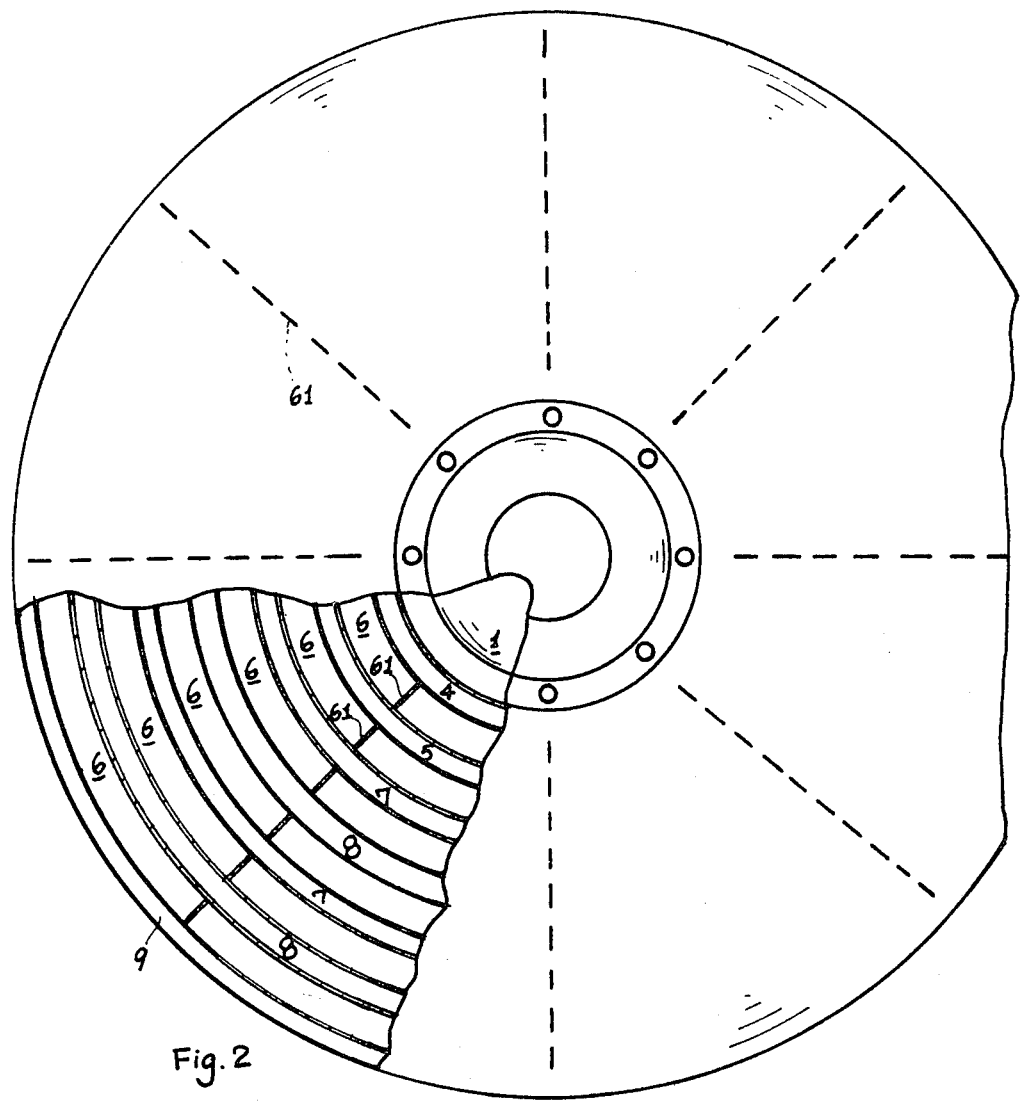
FIG. 2 is a bottom-view partial sectional drawing of the present invention.

As shown in FIG. 1 and FIG. 2, the present invention comprises a vaporizing chamber 1, a combustion chamber 2, a preheated water jacket 3 surrounding the combustion chamber, a top-opened pressurized water jacket 4 surrounding the vaporizing chamber, a bottom-open water jacket 5 surrounding said water jacket 4, a plurality of water jackets combinations 7, 8 subsequently developed outwards each comprising an inner water jacket 7 communicated with its inner water jacket and an outer water jacket 8 communicated with its outer water jacket, a plurality of sandwiched flues 6 each respectively partitioned between each two neighbouring water jackets, an outmost water jacket 9 connected to a stack 62 and supported by a supporting frame 96 and a boosting pump 34.

Said vaporizing chamber 1 is positioned centrally in the present boiler and is made as hollow spherical body 11 or other suitably shapes. Two atomizers 12 are provided in its upper portion. A maintenance hole 13 is provided on the bottom portion of said chamber 1. Said atomizers 12 also serve as fixing frame sturdily fix said chamber 1 in the present boiler.

Said combustion chamber 2 is surrounded by said preheated water jacket 3. A steam delivery pipe 21 is poked into said chamber 1 to lead steam into said chamber 2. Said pipe 21 is then wound to form a coil 22 which is connected with a discharge pipe 23 connected with a safety relief valve 24. A burner 2a is provided on the bottom portion of said chamber 2. Naturally, said combustion chamber 2 and said pre-heated water jacket 3 may be positioned aside said vaporizing chamber 1.

Said preheated water jacket 3 is made as a cylindrical jacket 3a surrounding said combustion chamber 2. A water pipe 31 is connected with said water discharging pipe 52 of said water jacket 5. A by-pass drain 32 is formed on said pipe 31. Said pipe 31 is then connected to said jacket 3a. A suction pipe 33 is provided to connect the jacket 3a with said boosting pump 34. A discharge pipe 35 is provided to connect said pump 34 with said pressurized water jacket 4.

Said pressurized water jacket 4 comprises two connectors 41 to communicate with the two atomizers 12 of said vaporizing chamber 1. A flue hole 42 is centrally formed atop on said jacket 4. The bottom periphery 43 of jacket 4 is positioned on said preheated water jacket 3. A sandwiched flue 6 is formed between said chamber 1 with said jacket 4.

Said top-opened water jacket 4 is connected to said bottom-opened water jacket 5 by a flue baffle 61. An annular flue hole 51 is formed between the lowest perimeter of said jacket 5 with the wall of said jacket 3a. A water discharge pipe 52 is provided to connect said water pipe 31 of said water jacket 3. Said jacket 5 is connected to a top-opened water jacket 7 by a baffle 61. Said jacket 7 is further connected to an outer water jacket 8 having bottom annular hole 81. Connectors 82 are provided to connect said jacket 8 with said inner jacket 7. Said jacket 7 is connected with said jacket 8 to form a water jacket combination. The number of said combination 7, 8 can be adjusted according to the practical requirement, for example, the combinations may be designed as two sets as shown in FIG. 1. Said inner jacket 7 of first jacket combination 7, 8 is communicated with said inner jacket 5 by connectors 71. However, said jacket 7 of second (outer) jacket combination 7, 8 is communicated with said jacket 8 by another pair of connectors 71 as FIG. 1 shown. Each jacket 7 is centrally formed a flue hole 72 atop on said jacket 7. The number of jacket combination 7, 8 is not limited in the present invention. The lowest perimeter of said jacket 7 is approaching to said jacket 3a.

Figure 3:
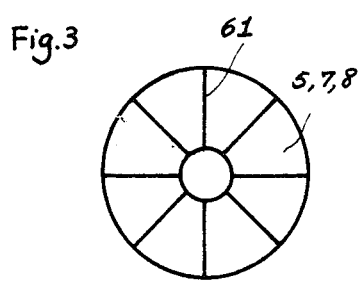
FIG. 3 is an illustration showing the arrangement of the flue baffles of the present invention.
Figure 4:
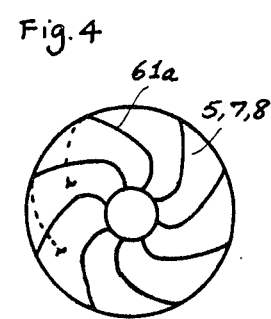
FIG. 4 is an illustration showing another arrangement of the flue baffles of the present invention.
Figure 5:
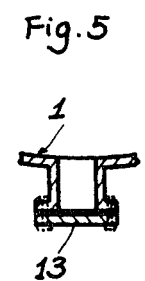
FIG. 5 is a partial sectional drawing of a maintenance hole of the present invention.

Said flue baffle 61 can be made as radial type as shown in FIG. 2 and FIG. 3. The spiral type 61a as shown in FIG. 4 or other forms may be modified. The baffles can increase the heat-exchange efficiency between the flues with the water jackets. The outmost water jacket 9 is connected to said jacket 8 by a baffle 61. The flue formed therebetween is communicated with said stack 62. Said outmost water jacket 9 is provided with a feed water pipe 91 which is connected with a valve 92 and a check valve 93. A vent 94 is formed atop on said jacket 9 to discharge air therethrough when charging the present boiler. Connectors 95 are provided to communicate said jacket 9 with said inner jacket 8. A supporting frame 96 is provided to support the jacket 9 and the present invention.

The outer jackets can be made from any anti-corrosive materials to prevent from any corrosion at dew point of flue gas such as below 250° C. Each water jacket may be formed with a maintenance hole M for cleaning use and may be provided with a drain D for draining or blow-down uses. Whenever opening the maintenance hole M for cleaning, said preheated jacket 3 can be first dismantled for convenient maintenance.

When using the present invention, feed water w is charged into the boiler through pipe 91 into all water jackets 9, 8, 7 and 5 for preheating by the heated flue gas through all flues 6. The pre-heated water is then led into said water jacket 3 and boosted by said pump 34 into said jacket 4. The water is then pressurized and sprayed through said atomizers 12 into said vaporizing chamber 1 whereby the water mist is heated to become steam and discharged through pipe 21. The steam is superheated in combustion chamber 2 in said coil 22 for producing superheated high-pressure steam for final consumption through pipe 23. The flue gas F will pass upwards and downwards in many passes through all flues 6 to perform heat-exchange operation with the water jackets to thoroughly heat the water therein and be drafted through said stack 62 at said outmost jacket 9 at about ambient temperature.

The present invention is preferably made as spherical shape. Other suitable shapes may be modified. An automatic inter-related control system may be set up by those skill in the art for said boosting pump 34 with respect to the capacity of said vaporizing chamber 1 and the operating variable of said burner 2a to obtain optimization for the present boiler operation.

The present invention is superior to any conventional boiler by the following advantages:
1. The feed water in all jackets is thoroughly preheated by the flue gas to save fuel cost and increase the boiler efficiency.
2. The materials of the parts other than the central vaporizing chamber 1 and pressurized jacket 4 can be made thinner as they do not sustain the higher pressure. Hence, the thermal efficiency can be increased and the production cost can be decreased.
3. The insulated material for the outmost water jacket can be saved as the shell temperature is equal or approaching to the ambient temperature.
4. The central high-pressure chamber 1 is disposed by many jackets 4, 5, 7, 8, 9 so that, once accidentally exploded, the explosion wave or broken scraps may be buffered by the outer jackets and the possible damage can be reduced to minimum.
5. The spherical structure of the preferred present invention can be stressed homogeneously and thus can be used more strongly in a longer service life.

The number of atomizers 12 and all connectors are not limited in the present invention, which can be modified in practical requirements.

For multiplying the steam capacity, a plurality of boilers of the present invention may be connected in parallel to increase the steam production rate for larger comsumption.

If the combustion chamber 2 is positioned aside (not under) said vaporizing chamber 1, the flue holes of each water jacket combination, for example, jacket 4 and jacket 5, jacket 7 and jacket 8, should be made counter-current so that one flue hole of one water jacket is approaching said flue stack 62 and another flue hole of another water jacket of the jacket combination is approaching said combustion chamber 2 or burner for reciprocatively passing the flue gas within the flues.

I claim:
1. A safety boiler with high efficiency comprising:
a vaporizing chamber, positioned centrally within the boiler, which is provided with several atomizers respectively connected to a pressurized water jacekt and a steam pipe being poked into said chamber to lead steam into a coil in a combustion chamber for superheating the steam;
said pressurized water jacket surrounding said vaporizing chamber, which is centrally formed with a top flue hole atop thereon;
a combustion chamber heated by a burner and positioned under said vaporizing chamber;
a preheated water jacket, surrounding said combustion chamber, which is provided with water pipe communicated with said water jacket surrounding said pressurized water jacket and provided with a boosting pump to suck water from said preheated jacket and boost water into said pressurized water jacket;
a water jacket, surrounding said pressurized water jacket, which is formed with an annular flue hole between its lowest perimeter with said preheated water jacket;
a plurality of water jacket combinations each comprising an inner top-opened water jacket communicated with its inner water jacket and an outer bottom-opened water jacket communicated with its outer water jacket, being subsequently developed outwards;
a plurality of sandwiched flues each respectively partitioned between each two neighbouring water jackets, each sandwiched flue comprising a flue baffle, connecting the two neighbouring water jackets and being made as radial type or spiral type; and
an outmost water jacket, communicated with its inner water jacket and connected outwards with a stack which is communicated with said flues, being supported by a frame connected thereunder;
said vaporizing chamber and each said water jacket being respectively formed with a maintenance hole; the flue holes of each water jacket combination being made counter-current so that one flue hole of one water jacket is approaching said flue stack and another flue hole of another water jacket of the jacket combination is approaching said combustion chamber or burner for reciprocatively passing flue gas within the flues partitioned between the water jackets.

* * * * *